United States Patent
Wood et al.

(10) Patent No.: US 11,042,415 B2
(45) Date of Patent: Jun. 22, 2021

(54) MULTI-TENANT EXTRACT TRANSFORM LOAD RESOURCE SHARING

(71) Applicant: International Business Machines Corporation, Armonk, NY (US)

(72) Inventors: Alexander Robert Wood, Romsey (GB); Chengxuan Xing, Romsey (GB); Doina Liliana Klinger, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 23 days.

(21) Appl. No.: 16/686,441

(22) Filed: Nov. 18, 2019

(65) Prior Publication Data

US 2021/0149728 A1    May 20, 2021

(51) Int. Cl.
*G06F 9/50* (2006.01)
*G06F 16/25* (2019.01)

(52) U.S. Cl.
CPC ............ *G06F 9/505* (2013.01); *G06F 9/5038* (2013.01); *G06F 9/5077* (2013.01); *G06F 16/254* (2019.01)

(58) Field of Classification Search
CPC ...................................................... G06F 9/505
See application file for complete search history.

(56) References Cited

U.S. PATENT DOCUMENTS

| 8,473,960 B2 * | 6/2013 | Chambliss | G06F 9/5083 718/104 |
| 8,533,103 B1 | 9/2013 | Certain | |
| 9,766,960 B2 | 9/2017 | Wang | |
| 10,033,702 B2 | 7/2018 | Ford | |
| 10,037,230 B2 | 7/2018 | Chen | |
| 10,228,974 B2 | 3/2019 | Xue | |
| 2006/0090163 A1 * | 4/2006 | Karisson | G06F 11/3409 718/105 |
| 2015/0046279 A1 | 2/2015 | Wang | |
| 2019/0089647 A1 | 3/2019 | Das | |

OTHER PUBLICATIONS

Shue et al., "Performance Isolation and Fairness for Multi-Tenant Cloud Storage", USENIX Association, 10th USENIX Symposium on Operating Systems Design and Implementation (OSDI '12), pp. 349-362.
Tan et al., "Tempo: Robust and Self-Tuning Resource Management in Multi-tenant Parallel Databases", Proceedings of the VLDB Endowment, vol. 9, No. 10, pp. 720-731, Copyright 2016 VLDB Endowment 2150-8097/16/06.

* cited by examiner

*Primary Examiner* — Charlie Sun
(74) *Attorney, Agent, or Firm* — Gilbert Harmon, Jr.

(57) ABSTRACT

Concepts for sharing processing resource of a multi-tenant extract transform load, ETL, system are presented. In such concepts, a total workload of the multi-tenant ETL system is considered along with the queued workload of tenant in order control deliver of the queued workload to the system. Such control is undertaken, for example, by delaying the work of the tenant. Proposed embodiments therefore seek to devise a policy to achieve fairness amongst tenants.

20 Claims, 4 Drawing Sheets

MULTI-TENANT EXTRACT TRANSFORM LOAD RESOURCE SHARING

BACKGROUND

The present invention relates generally to the field of processing in a multi-tenant system, and in particular to a method for sharing processing resources of a multi-tenant extract transform load (ETL) system.

The present invention also relates to a computer program product comprising computer-readable program code that enables a processor of a system, or a number of processors of a network, to implement such a method.

The present invention also relates to a system for sharing processing resources of a multi-tenant ETL system.

In a multi-tenant ETL system, large volumes of data are extracted and processed asynchronously in a highly parallel way from multiple different tenants. The data is extracted page by page and queued for processing by a shared processing engine (or cluster).

Multiple tenants might submit large amounts of work, and that work is then queued for processing in the shared processing engine. Accordingly, one tenant's work can monopolize the system with high volumes of data and delay the processing of another tenant's work. This is unfair to other tenants that should receive the same level of service (e.g. tenants within the same category). Although a particular category of tenants might get better quality of service than another category of tenants (e.g. a system may be configured to provide paid or premium customers with a higher level of service than unpaid or standard customers), tenants within the same category will all expect to receive the same level of service. In other words, a typical expectation is that a multi-tenant ETL system should be fair to all tenants within the same category.

SUMMARY

According to an embodiment of the present invention, a computer-implemented method for sharing processing resources of a multi-tenant extract transform load (ETL) system, the method comprising: determining, by one or more processors, a total workload of the multi-tenant ETL system; determining, by the one or more processors, a queued workload associated with a tenant; and delaying, by the one or more processors, the addition of work requested by the tenant to the workload of the multi-tenant ETL system based on the total workload and the queued workload.

According to another embodiment of the present invention, a computer program product comprising a computer readable storage medium having program instructions embodied therewith, the program instructions executable by a processing unit to cause the processing unit to perform, when run on a computer network, a method for sharing processing resources of a multi-tenant extract transform load (ETL) system, wherein the method comprises: determining a total workload of the multi-tenant ETL system; determining a queued workload associated with a tenant; and delaying the addition of work requested by the tenant to the workload of the ETL system based on the total workload and the queued workload.

According to another embodiment of the present invention, a system for sharing processing resources of a multi-tenant extract transform load (ETL) system, the system comprising: a workload component configured to determine a total workload of the multi-tenant ETL system; an analysis component configured to determine a queued workload associated with a tenant; and a delay component configured to delay the addition of work requested by the tenant to the workload of the multi-tenant ETL system, based on the total workload and the queued workload.

BRIEF DESCRIPTION OF THE DRAWINGS

Preferred embodiments of the present invention will now be described, by way of example only, with reference to the following drawings, in which.

DETAILED DESCRIPTION

Figure 1:
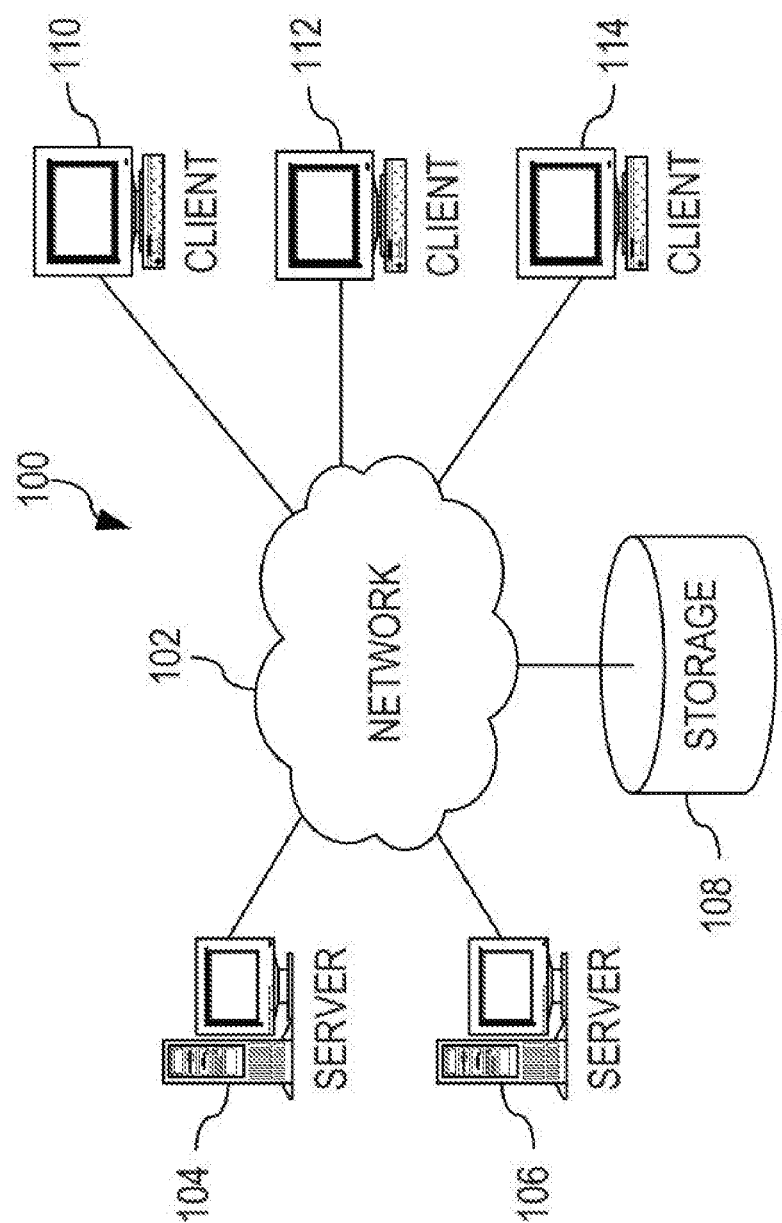
FIG. 1 depicts a pictorial representation of an example distributed system in which aspects of the illustrative embodiments may be implemented.

It should be understood that the figures are merely schematic and are not drawn to scale. It should also be understood that the same reference numerals are used throughout the figures to indicate the same or similar parts.

In the context of the present application, where embodiments of the present invention constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention. Further, a component may be an integration flow that is executed by one or more processing units.

Proposed are concepts for sharing processing resources of a multi-tenant extract transform load (ETL) system. In such concepts, a total workload of the multi-tenant ETL system is considered along with the queued workload of a tenant in order to control delivery of the queued workload to the system. Such control is undertaken, for example, by delaying the work of the tenant. Proposed embodiments therefore seek to devise a policy to achieve fairness amongst tenants.

Embodiments may therefore be thought of as being configured to slow down work that is being provided to a system at a given time. It is proposed that this may be done by measuring a number of concurrent streams of active work for a tenant. For instance, a tenant having a large number of concurrent streams of active work may have the addition of such work delayed by embodiments described herein. This may prevent the tenant from monopolizing (i.e., overloading) the system with high volumes of data, which would otherwise delay the processing of another tenant's work.

Accordingly, proposed embodiments may automatically and dynamically control the addition of a tenant's workload in consideration of a total workload of the system. For example, based on a total workload of the system, and a queued workload associated with a tenant, the addition of work requested by that tenant may be delayed/postponed. In this way, fairness in sharing processing resources of the system may be achieved. Concepts for achieving fairness for a category (e.g. paid, unpaid, premium, platinum etc.) of tenants may be provided.

The proposed concepts may be particularly valuable and/or advantageous for ETL systems because they may leverage the increased level of predictability associated with ETL systems, due to their chain of extract requests, to achieve fairness across multiple tenants.

Since the data extraction takes time, it is common to execute the three extract transform load phases in parallel. As the data is being extracted, another transformation process executes while processing the data that is already received and prepares it for loading, while the data loading begins without waiting for the completion of the previous phases. Proposed embodiments take advantage of this and focus on achieving fairness for tenants by controlling a delay of the addition of work requested by a tenant to the workload.

In particular, it is proposed to delay the addition of a tenant's work to an ETL system workload based on a measure of the total workload currently queued in the system. Such a measure of the amount of work to be processed in the system may, for example, be indicated by a lag in the system.

Proposed embodiments may seek to facilitate fairness among the tenants of a category (i.e. a group, collection, class, type, classification, etc.) by monitoring the overall load within the system and the work associated with a tenant and, in case of an overload, by introducing a delay in the extract paging. The delay may be proportional with the work generated by each tenant. This may be referred to as "pacing."

By way of example, an embodiment may monitor the overall load by measuring the amount of work that has been queued for all tenants. Such an embodiment may then slow down the addition of new work for each tenant. The "pacing" delay may, for instance, be calculated based on the overall work queue depth (e.g., lag) and also the workload (e.g., the number of running ETL batches) from each tenant.

By determining when pacing is needed, personalized pacing factors may be computed and applied by proposed embodiments. This may provide improved user experience and perception of a product implementing a proposed embodiment.

By way of example, proposed embodiments may provide for sharing processing resources of a multi-tenant ETL system. Such embodiments may comprise determining a total workload of the multi-tenant ETL system. For each tenant using the multi-tenant ETL system, an associated queued workload may be then be determined. Based on the determined total workload and the queued workload associated with a tenant, the addition of work requested by the tenant to the workload of the multi-tenant ETL system may then be delayed.

Some embodiments may also comprise computing, for each tenant using the multi-tenant ETL system, an associated delay coefficient based on the queued workload associated with the tenant. Further, delaying the addition of work requested by the tenant to the workload of the system by introducing a delay to work requested by the tenant based on the delay coefficient associated with the tenant.

Further, computing an associated delay coefficient based on the queued workload associated with the tenant may comprise computing the delay coefficient to be equal to a predetermined default value if the queued workload associated with the tenant is less than a predetermined threshold value.

Computing an associated delay coefficient based on the queued workload associated with the tenant may comprise computing the delay coefficient to be directly proportional to the queued workload associated with the tenant.

By way of further example, embodiments may further comprise: monitoring the total workload of the multi-tenant ETL system to detect a change in the total workload; and modifying the delay coefficient responsive to a detected change in the total workload.

Determining a total workload of the multi-tenant ETL system may comprise measuring at least one of: a total amount of work queued for all tenants of the multi-tenant ETL system; and a value of current delay in the multi-tenant ETL system.

Also, determining a queued workload associated with a tenant may comprise measuring at least one of: a number of processes running for the tenant; an amount of work queued for the tenant; a number of concurrent streams of work active for the tenant; and a number of processing requests currently registered for the tenant.

Embodiments may be implemented in conjunction with existing ETL systems. In this way, the functionalities and/or utility of multi-tenant ETL systems may be improved upon by incorporating the proposed embodiments.

FIG. 1 depicts a pictorial representation of an exemplary distributed system in which aspects of the illustrative embodiments may be implemented. A distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, first server 104 and second server 106 are connected to the network 102 along with a storage unit 108. In addition, clients 110, 112, and 114 are also connected to the network 102. The clients 110, 112, and 114 may be edge devices, for example, personal computers, network computers, IoT devices, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 may be the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Those of ordinary skill in the art will appreciate that the architecture and/or hardware in FIG. 1 may vary depending on the implementation. Also, the processes of the illustrative embodiments may be applied to a multiprocessor data processing system, without departing from the scope of the present invention.

As detailed above, proposed embodiments provide a method and system for sharing processing resources of a multi-tenant ETL system. By way of further explanation, a proposed embodiment will now be described with respect to a distributed communication system including an ETL system catering to multiple tenants.

Figure 2:
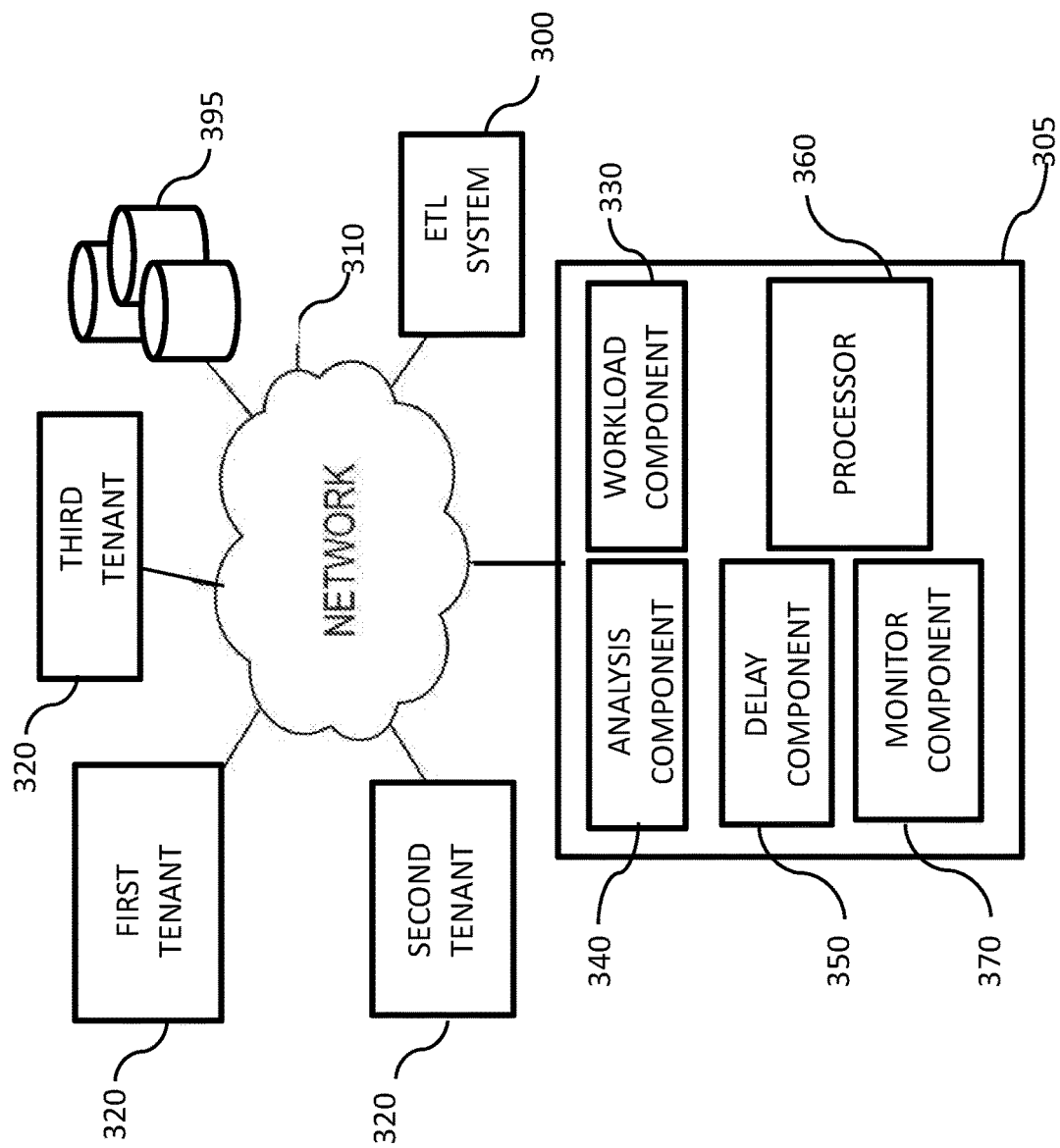
FIG. 2 depicts a schematic diagram of a proposed distributed communication system according to an embodiment.

Referring to FIG. 2, depicted is a schematic diagram of a distributed communication system according to an embodiment. The distributed communication system includes an ETL system 300, session storage 395 and a system 305 for sharing processing resources of the ETL system 300. Here, it is worth noting that the ETL system 300 comprises various components contributing to the processing of ETL batches which can contain very large volumes of data (e.g., millions of records). These components may include a controller system (e.g., batch controller), systems from which the controller extracts data, SaaS applications or Enterprise systems, and a processing engine that processes extracted records. Any or all of these components may potentially interact with other external systems via a communication network 310 (e.g., the Internet).

The ETL system 300 can be accessed by a plurality of tenants 320 via the communication network 310 (e.g. the Internet). Here, the plurality of tenants comprises the first tenant to the third tenant.

In the depicted example of FIG. 2, the system 305 for sharing processing resources of the ETL system 300 is illustrated as being external to the ETL system 300. However, this is only to aid illustration of the system 305 and its various components. It is therefore to be understood that embodiments may be directed to controlling the Extract phase of an ETL system 300 and the system 305 may thus form part of the ETL system 300 itself since the Extract process can be a series of Pull operations and can be initiated from within the ETL system 300.

The system 305 for sharing processing resources comprises a workload component 330 that is configured to determine a total workload of the ETL system 300. In this example, the workload component 330 is configured to measure at least one of: a total amount of work queued for all tenants 320 of the multi-tenant ETL system 300; and a value of current delay in the multi-tenant ETL system 300. Such measure may be representative of the total workload of the ETL system 300.

The system 305 for sharing processing resource also comprises an analysis component 340. The analysis component 340 is configured to determine a queued workload for each tenant 320 using the multi-tenant ETL system 300. More specifically, the analysis component 340 of this exemplary embodiment is configured to measure at least one of: a number of processes running for the tenant 320; an amount of work queued for the tenant 320; a number of concurrent streams of work active for the tenant 320; and a number of processing requests currently registered for the tenant 320.

A delay component 350 of the system 305 for sharing processing resource is configured to delay the addition of work requested by a tenant 320 to the workload of the multi-tenant ETL system 300, based on the determined total workload and the queued workload associated with that tenant 320. In this regard, it is noted that the system 305 of this exemplary embodiment also includes a processor 360 that is configured to, for tenants 320 using the multi-tenant ETL system 300, compute an associated delay coefficient based on the queued workload associated with a tenant 320. The delay component 350 of this exemplary embodiment can then introduce a delay to work requested by a tenant 320, based on a delay coefficient associated with the tenant 320.

In this embodiment, and purely by way of example only, the processor 360 can be configured to compute the delay coefficient to be equal to a predetermined default value if the queued workload associated with the tenant 320 is less than a predetermined threshold value. Furthermore, the processor 360 can be configured to compute the delay coefficient to be directly proportional to the queued workload associated with the tenant 320. In this way, the higher/larger the queued workload for a tenant 320, the greater/larger the delay coefficient, thereby adjusting control of a delay to work request by a tenant 320 according to the queued workload for that tenant 320.

The system 305 for sharing processing resources in this embodiment also includes a monitor component 370. The monitor component 370 can be configured to monitor the total workload of the multi-tenant ETL system 300 to detect a change in the total workload. Responsive to a detected change in the total workload, the processor 360 can modify the delay coefficient. In this way, the higher/larger the total workload, the greater/larger the delay coefficient, thereby adjusting control of a delay applied to work according to the workload of the system 305.

By way of further example, we may now consider another exemplary embodiment.

As mentioned above, an ETL system 300 can comprise various components contributing to the processing of ETL batches. These components include a controller system (e.g. batch controller), systems from which the controller extracts data, SaaS applications or Enterprise systems, and a processing engine that processes extracted records. Any or all of these components may potentially interact with other external systems.

Components of an ETL system may use a high-throughput, low-latency messaging system (such as Kafka) to communicate and pass data between them. By way of example, Kafka defines topics with a number of partitions, producers and groups of consumers for the messages.

An important consideration is the consumer lag. This is the difference between how many messages are being written and how many messages are being read. Consumer lag may therefore be used as a measure of how far behind the group of consumers of messages are compared to the producers of messages. For instance, a large/high consumer lag value means that the extracted data of new ETL batches will take a long time to process and the system will appear unresponsive to some tenants 320.

For simplicity, it may be assumed that all tenants 320 are in one category (e.g., paid users, at the same rate). If several categories exist, the proposed concepts may be thought of as applying within the boundary of a single category, and then applied to other categories separately.

A large volume of ETL batches is gathered by a controller system (e.g., batch controller) and is then handled by other processing components (e.g., flow engine) which receives the work through a messaging system (e.g., Kafka). Each ETL batch may extract an ordered list (e.g., pages) of records through a chain of extract requests.

Proposed embodiments may use a combination of session storage 395 and a messaging system like Kafka to implement a policy of distributing the work (e.g., ETL batches) to external systems (SaaS or Enterprise applications) in a way that ensures that tenants 320 have a fair share of the overall system resources and tenants get a chance to see their work progress.

By way of example, when the controller system gets an ETL batch, it will publish the first request (e.g., a page) in the chain onto the queue without any delay to ensure all work items are started. It will also register the ETL batch in the session storage 395. The consumer lag of the processing queue is then monitored and, when the consumer lag of the processing queue exceeds a threshold, the system may inject a delay (e.g., set pacing) from the second request onwards of the chains.

Embodiments may employ the following information to determine how long the next request of a specific tenant 320 should be delayed: the overall depth of queue of the messaging system (i.e., total work in the system); how many ETL batches are currently registered in the session storage 395 (i.e., concurrent ETL batches); and the pre-configured initial value for the overall delay coefficient. Based on such information, an embodiment may compute a delay coefficient that is specific to a tenant 320 and which controls the delay to be induced (if any).

A subsequent extract request will be put into the queue after the delay and the registered information in the session storage 395 will be updated with its new position in the chain.

Figure 3:
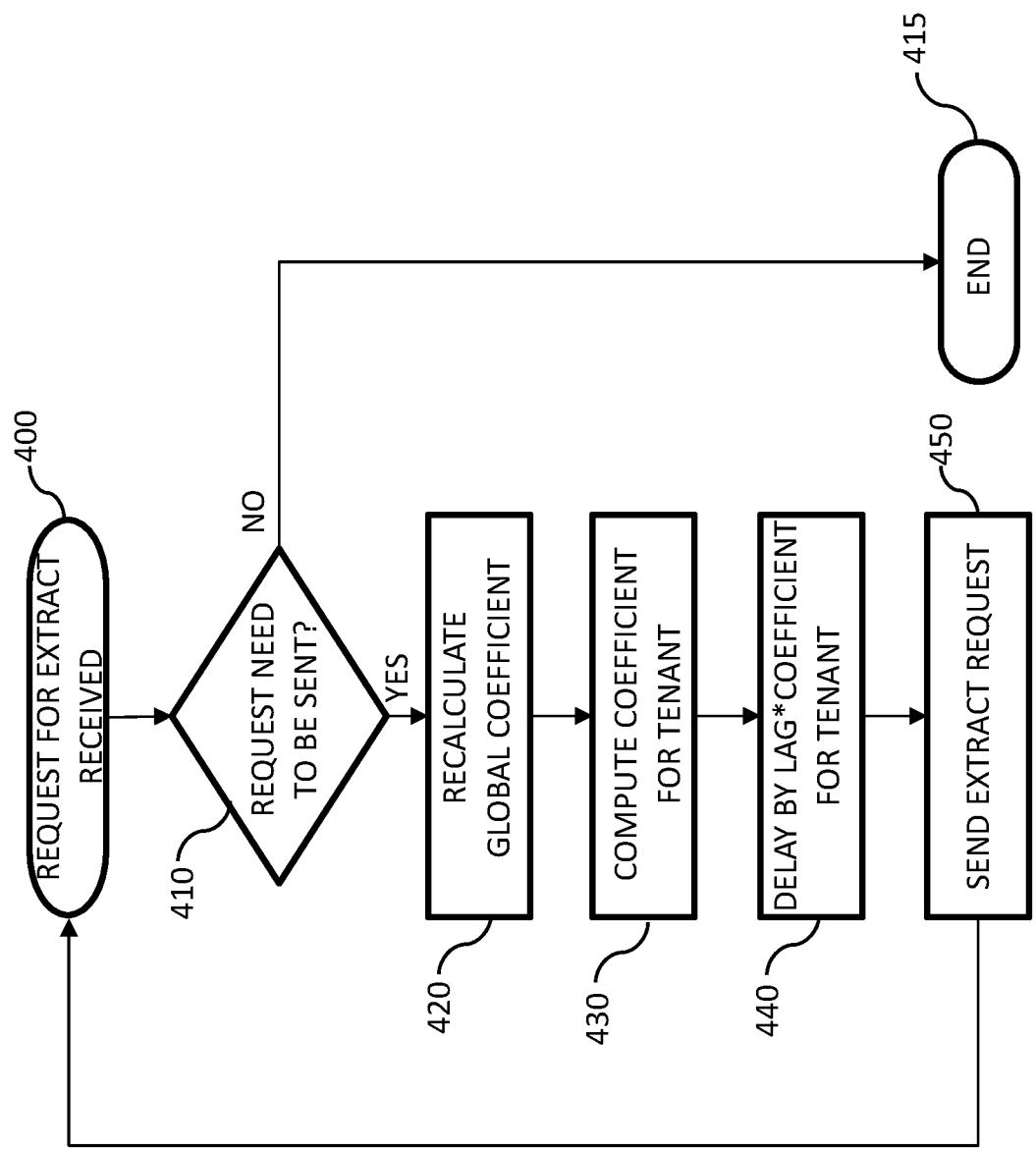
FIG. 3 depicts flow diagram of a method for sharing resources of an ETL system according to an embodiment.

Referring now to FIG. 3, a method according to an embodiment will now be described. In particular, FIG. 3 shows a flow diagram of a method for sharing resources of an ETL system 300 according to a proposed embodiment.

Initially, a global delay coefficient is set with an initial value.

When a new extract page request is received 400 (e.g., next request in a chain is processed) the method begins and proceeds to step 410. In step 410, it is determined if a new page of extracted data needs to be sent. If not, the method simply proceeds to end at step 415. Conversely, if, in step 410, it is determined that a new page of extracted data needs to be sent to the processing engine, the method proceeds to step 420, wherein the global delay coefficient is recalculated and updated. Here, this comprises computing the current lag from the processing queue and comparing it with the old lag (retrieved from session storage 395) to increase or decrease the global coefficient.

Based on the updated global delay coefficient, a delay coefficient for the current tenant 320 is computed in step 430. Here, this comprises collecting the number of ETL batches running for the current tenant 320 from the session storage 395 and then computing the delay coefficient to use for the current tenant 320 by multiplying the global delay coefficient by the number of ETL batches owned by the current tenant 320, i.e., tenant delay coefficient=global coefficient*number of ETL batches owned by tenant.

Next, in step 440, a delay or wait is introduced. Here, the delay or wait is determined by multiplying the lag by the tenant delay coefficient. Put another way, the delay or wait may be represented as wait=(lag*tenant delay coefficient).

After delaying/waiting by the determined amount of time, the controller system sends the new extract request in step 450 and the method then returns to step 400.

Thus, it will be understood that the more ETL batches a tenant 320 starts the bigger the coefficient and the bigger the delay/wait.

Figure 4:
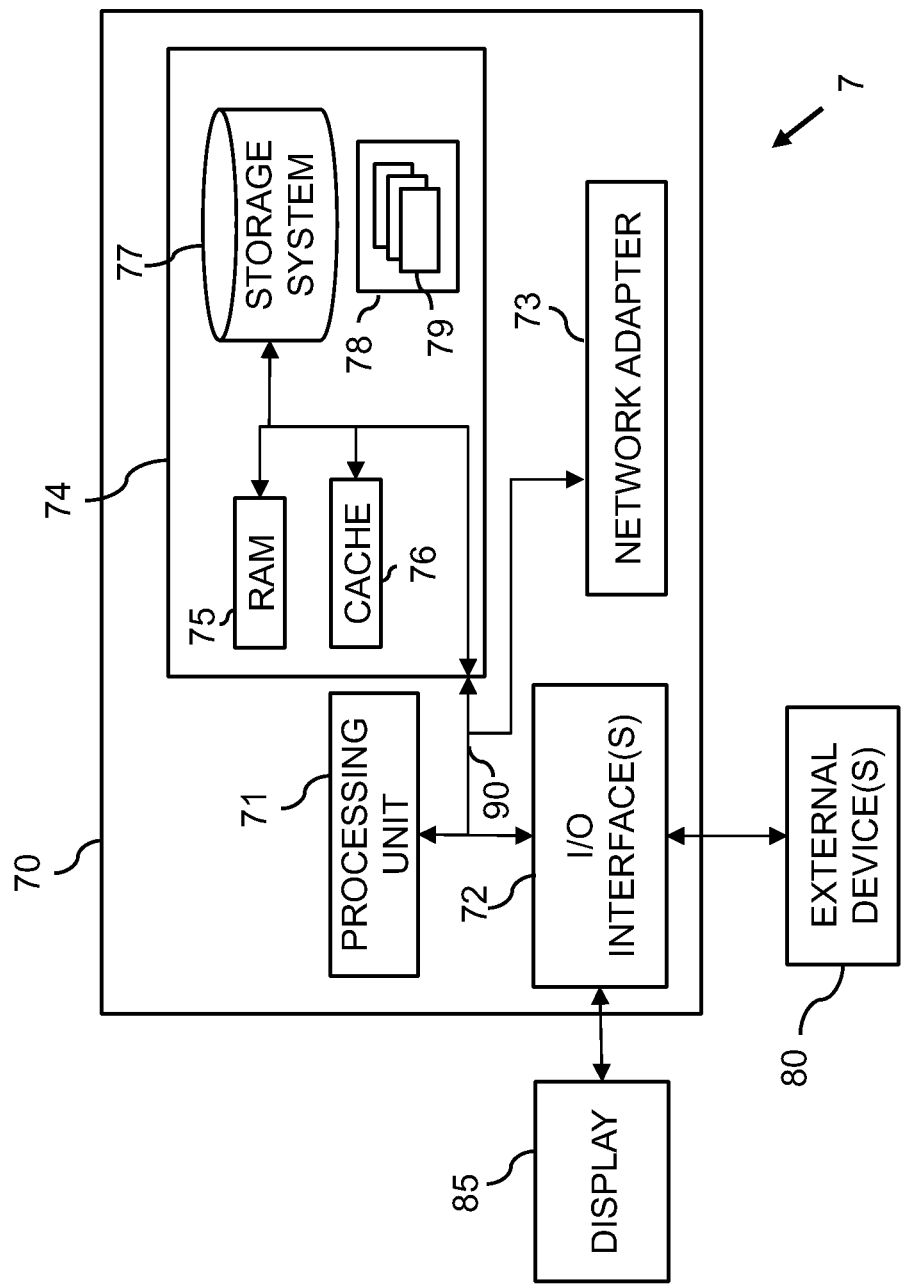
FIG. 4 depicts a block diagram of components of the server and/or a client, in accordance with an embodiment of the present invention.

Embodiments may comprise a computer system 70, which may form part of a networked system 7 illustrated in FIG. 4. For instance, a delay component configured to delay the addition of work requested by a tenant 320 to the workload of the multi-tenant ETL system 300 according to an embodiment may be implemented in the computer system 70 (e.g., a processing unit 71). The components of computer system/server 70 may include, but are not limited to, one or more processing arrangements, for example comprising processors or processing units 71, a system memory 74, and a bus 90 that couples various system components including system memory 74 to processing unit 71.

System memory 74 can include computer system readable media in the form of volatile memory, such as random access memory (RAM) 75 and/or cache memory 76. Computer system/server 70 may further include other removable/non-removable, volatile/non-volatile computer system storage media. In such instances, each can be connected to bus 90 by one or more data media interfaces. The memory 74 may include at least one program product having a set (e.g., at least one) of program modules that are configured to carry out the functions of proposed embodiments. For instance, the memory 74 may include a computer program product having program instructions executable by the processing unit 71 to cause the Input/Output (I/O) interface 72 to perform a method for sharing processing resource of a multi-tenant ETL system 300 according to a proposed embodiment. Program/utility 78, having a set (at least one) of program modules 79, may be stored in memory 74. Program modules 79 generally carry out the functions and/or methodologies of proposed embodiments for sharing processing resource of a multi-tenant ETL system 300.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73 (e.g. to communicate determined development rules to devices of a distributed network).

In the context of the present application, where embodiments of the present invention constitute a method, it should be understood that such a method is a process for execution by a computer, i.e. is a computer-implementable method. The steps of the method therefore reflect various parts of a computer program, e.g. parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, Python, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for sharing processing resources of a multi-tenant extract transform load (ETL) system, the method comprising:
   determining, by one or more processors, a total workload of the multi-tenant ETL system;
   determining, by the one or more processors, a queued workload associated with a tenant; and delaying, by the one or more processors, the addition of work requested by the tenant to the workload of the multi-tenant ETL system based on the total workload and the queued workload.

2. The method of claim 1, further comprising:
computing, by the one or more processors, an associated delay coefficient for the tenant based on the queued workload,
and wherein the delaying further comprises introducing a delay to work requested by the tenant based on the delay coefficient associated with the tenant.

3. The method of claim 2, wherein computing an associated delay coefficient based on the queued workload associated with the tenant comprises:
computing the delay coefficient to be equal to a predetermined default value if the queued workload associated with the tenant is less than a predetermined threshold value.

4. The method of claim 3, further comprising:
monitoring the total workload of the multi-tenant ETL system to detect a change in the total workload; and
modifying the delay coefficient responsive to a detected change in the total workload.

5. The method of claim 3, wherein computing an associated delay coefficient based on the queued workload associated with the tenant comprises:
computing the delay coefficient to be directly proportional to the queued workload associated with the tenant.

6. The method of claim 1, wherein determining a total workload of the multi-tenant ETL system comprises measuring at least one of:
a total amount of work queued for tenants of the multi-tenant ETL system; and
a value of current delay in the multi-tenant ETL system.

7. The method of claim 1, wherein determining a queued workload associated with a tenant comprises measuring at least one of:
a number of processes running for the tenant;
an amount of work queued for the tenant;
a number of concurrent streams of work active for the tenant; and
a number of processing requests currently registered for the tenant.

8. A computer program product comprising a computer readable storage medium having program instructions embodied therewith, the program instructions executable by a processing unit to cause the processing unit to perform, when run on a computer network, a method for sharing processing resources of a multi-tenant extract transform load (ETL) system, wherein the method comprises the steps of:
determining a total workload of the multi-tenant ETL system;
determining a queued workload associated with a tenant; and
delaying the addition of work requested by the tenant to the workload of the ETL system based on the total workload and the queued workload.

9. The computer program product of claim 8, further comprising:
computing, by the one or more processors, an associated delay coefficient for the tenant based on the queued workload,
and wherein the delaying further comprises introducing a delay to work requested by the tenant based on the delay coefficient associated with the tenant.

10. The computer program product of claim 9, wherein computing an associated delay coefficient based on the queued workload associated with the tenant comprises:
computing the delay coefficient to be equal to a predetermined default value if the queued workload associated with the tenant is less than a predetermined threshold value.

11. The computer program product of claim 10, further comprising:
monitoring the total workload of the multi-tenant ETL system to detect a change in the total workload; and
modifying the delay coefficient responsive to a detected change in the total workload.

12. The computer program product of claim 10, wherein computing an associated delay coefficient based on the queued workload associated with the tenant comprises:
computing the delay coefficient to be directly proportional to the queued workload associated with the tenant.

13. The computer program product of claim 8, wherein determining a queued workload associated with a tenant comprises measuring at least one of:
a number of processes running for the tenant;
an amount of work queued for the tenant;
a number of concurrent streams of work active for the tenant; and
a number of processing requests currently registered for the tenant.

14. A system for sharing processing resources of a multi-tenant extract transform load (ETL) system, the system comprising:
a workload component configured to determine a total workload of the multi-tenant ETL system;
an analysis component configured to determine a queued workload associated with a tenant; and
a delay component configured to delay the addition of work requested by the tenant to the workload of the multi-tenant ETL system, based on the total workload and the queued workload.

15. The system of claim 14, further comprising:
a processor configured to compute an associated delay coefficient for the tenant based on the queued workload,
and wherein the delay component is further configured to introduce a delay to work requested by the tenant based on the delay coefficient associated with the tenant.

16. The system of claim 15, wherein the processor is further configured to compute the delay coefficient to be equal to a predetermined default value if the queued workload associated with the tenant is less than a predetermined threshold value.

17. The system of claim 16, further comprising:
a monitor component configured to monitor the total workload of the multi-tenant ETL system to detect a change in the total workload,
and wherein the processor is further configured to modify the delay coefficient responsive to a detected change in the total workload.

18. The system of claim 16, wherein the processor is further configured to compute the delay coefficient to be directly proportional to the queued workload associated with the tenant.

19. The system of claim 14, wherein the workload component is further configured to measure at least one of:
a total amount of work queued for tenants of the multi-tenant ETL system; and
a value of current delay in the multi-tenant ETL system.

20. The system of claim 14, wherein the analysis component is further configured to measure at least one of:

a number of processes running for the tenant;
an amount of work queued for the tenant;
a number of concurrent streams of work active for the tenant; and
a number of processing requests currently registered for the tenant.

* * * * *